United States Patent
Berumen et al.

(10) Patent No.: US 9,606,220 B2
(45) Date of Patent: Mar. 28, 2017

(54) SATELLITE AND ACOUSTIC TRACKING DEVICE

(71) Applicant: King Abdullah University of Science and Technology, Thuwal (SA)

(72) Inventors: Michael L. Berumen, Thuwal (SA); Lloyd E. Smith, Thuwal (SA); Pedro R. De la Torre Olazábal, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 14/918,519

(22) Filed: Oct. 20, 2015

(65) Prior Publication Data

US 2016/0041255 A1    Feb. 11, 2016

Related U.S. Application Data

(63) Continuation of application No. PCT/US2013/041622, filed on May 17, 2013.

(60) Provisional application No. 61/648,886, filed on May 18, 2012.

(51) Int. Cl.
| | |
|---|---|
| *G01S 5/18* | (2006.01) |
| *A01K 29/00* | (2006.01) |
| *G01S 19/13* | (2010.01) |
| *A01K 11/00* | (2006.01) |
| *G01S 19/48* | (2010.01) |
| *G01S 3/808* | (2006.01) |
| *A01K 61/00* | (2017.01) |

(52) U.S. Cl.
CPC .............. *G01S 5/18* (2013.01); *A01K 11/006* (2013.01); *A01K 11/008* (2013.01); *A01K 29/005* (2013.01); *A01K 61/001* (2013.01); *G01S 3/808* (2013.01); *G01S 19/13* (2013.01); *G01S 19/48* (2013.01)

(58) Field of Classification Search
CPC .. A01K 11/006; A01K 11/008; A01K 29/005; A01K 61/001; G01S 5/18; G01S 19/13; G01S 19/48; G01S 3/808
USPC ...................... 701/2; 367/127, 117–120, 131
See application file for complete search history.

(56) References Cited

U.S. PATENT DOCUMENTS

| | | | |
|---|---|---|---|
| 5,410,519 A * | 4/1995 | Hall | G01S 3/8083 367/127 |
| 5,563,849 A | 10/1996 | Hall | |
| 5,713,293 A | 2/1998 | Shiffer | |
| 6,097,670 A | 8/2000 | Johnson | |
| 6,388,949 B1 * | 5/2002 | Lenhardt | A01K 79/02 116/22 A |

(Continued)

OTHER PUBLICATIONS

Notification Concerning Transmittal of International Preliminary Report for Patentability (PCT/IB/326) Mailed Nov. 27, 2014.

(Continued)

*Primary Examiner* — Marthe Marc-Coleman
(74) *Attorney, Agent, or Firm* — Patent Portfolio Builders PLLC (57) ABSTRACT

The present invention relates a method and device for tracking movements of marine animals or objects in large bodies of water and across significant distances. The method and device can track an acoustic transmitter attached to an animal or object beneath the ocean surface by employing an unmanned surface vessel equipped with a hydrophone array and GPS receiver.

25 Claims, 7 Drawing Sheets

(56) References Cited

U.S. PATENT DOCUMENTS

| | | |
|---|---|---|
| 6,854,410 B1 | 2/2005 | King |
| 2004/0220856 A1 | 11/2004 | Moore |
| 2007/0051292 A1 | 3/2007 | Kilbourn |
| 2007/0077830 A1 | 4/2007 | Rzadki |
| 2010/0265655 A1 | 10/2010 | Metzler |
| 2011/0141853 A1 | 6/2011 | Megdal |

OTHER PUBLICATIONS

Notification of Transmittal of the International Search Report and the Written Opinion of the International Searching Authority, or the Declaration Mailed Feb. 18, 2014.

* cited by examiner

SATELLITE AND ACOUSTIC TRACKING DEVICE

CLAIM OF PRIORITY

This application is a continuation of PCT/US2013/041622, filed May 17, 2013, which claims priority to U.S. Patent Application Ser. No. 61/648,886, filed on May 18, 2012 and entitled "Satellite and Acoustic Tracking Device", each of which is incorporated by reference in its entirety.

TECHNICAL FIELD

The present invention relates to a method and device for tracking movements of marine animals or objects in large bodies of water and across significant distances.

BACKGROUND

The whale shark (*Rhincodon typus*) is a slow-moving, filter feeding shark and is the largest fish species in existence. Whale sharks as large as 12.6 meters have been measured, and the species is thought to grow even larger. Despite their appeal, very little is known about the basic biology and ecology of whale sharks. For example, little is known about their growth rates, maturation size or age, reproductive output, lifespan, or locations of breeding or birthing grounds. Estimates of global whale shark populations are unreliable and range widely from about 25,000 to 500,000 individuals.

While whale sharks are often observed feeding near the ocean surface, they are capable of diving to depths of more than 1000 meters. Since they have gills, and do not need to resurface for air, they can remain at significant depths for extended periods of time. This makes traditional scientific methods of estimating population size based on observation unreliable. Moreover, whale sharks reside throughout the tropics, and may not be restricted to living near coral reefs where observations can yield reliable population estimates for other species. Such a large geographical distribution complicates estimating global population, which in turn prevents conservation and management agencies from developing effective plans.

Understanding the movement patterns of large migratory species, such as whale sharks, great white sharks, tuna, and whales, is a critical step toward implementing effective management plans. Obtaining information about the movements of these species would open a window into behaviors never before observed and, through effective management plans, could result in population gains that would allow certain species to escape their endangered or threatened statuses. Understanding movements of these species could also benefit local economies situated near migratory pathways, which could attract sustainable eco-tourism revenue, and a portion of that revenue could be used to sustain effective management plans.

SUMMARY

In general, an unmanned surface vessel for tracking an acoustic transmitter attached to a marine animal or object is described. The unmanned surface vessel may include a surface vessel, which is configured to track and follow the movement of an acoustic transmitter attached to a marine animal or other object. A two-way communication module may be attached to the vessel and the communication module may be configured to communicate with a remote communication station. In at least one embodiment, the communication module may be configured to transmit information to the remote communication station. A GPS receiver may be attached to the vessel. The GPS receiver may be configured to receive location-based information from a global positioning system. Additionally, an acoustic hydrophone may be attached to a bottom surface of the vessel. The acoustic hydrophone may be configured to receive an acoustic signal transmitted from the acoustic transmitter attached to the marine animal or object. In at least one embodiment, the acoustic hydrophone is part of a three-element hydrophone array. Each hydrophone element may be coupled to an independent amplifier circuit.

A propulsion system may be attached to the bottom surface of the vessel. The propulsion system may be configured to enable the vessel to follow the movement of the acoustic transmitter. The propulsion system may also include at least one thruster attached to the bottom surface of the vessel. In at least one embodiment, the surface vessel may include a digital compass. Additionally, the surface vessel includes an accelerometer to determine the acceleration of the vessel. The surface vessel may also one or more sensors for determining water temperature, water salinity, water clarity, oceanographic current information, plankton concentration, water depth, water conductivity, or oxygen concentration. The surface vessel may also include a solar charging system comprising a battery, a solar panel attached to a top surface of the vessel, and a charge controller electrically connected between the battery and the solar panel.

DETAILED DESCRIPTION

Figure 8:
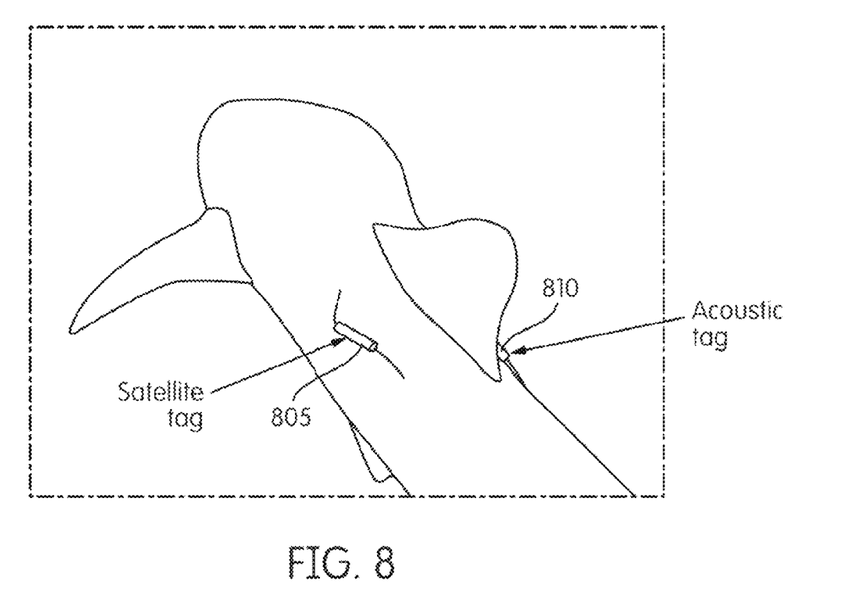
FIG. 8 is an existing approach for tracking a marine animal that requires attaching a satellite tag and an acoustic transmitter to the animal.
Figure 9:
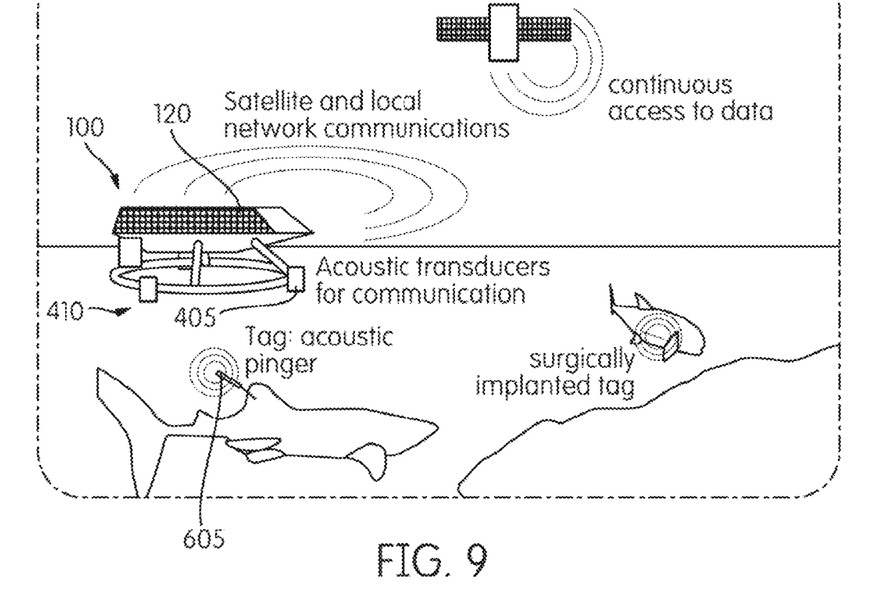
FIG. 9 is a simplified diagram of the vessel in the ocean.

Whale sharks can travel thousands of kilometers in a single year, but little is known about the details of their movements due to the shortcomings of existing tracking and tagging technologies. For example, a first existing tracking system relies on a satellite tag 805 attached to an animal, as shown in FIG. 8. Satellite tags 805 rely on the Global Positioning System ("GPS"), which is a satellite-based navigation system made up of a network of 24 satellites placed into orbit by the U.S. Department of Defense. GPS satellites transmit two low power radio signals, designated as L1 and L2. Civilian GPS uses the L1 frequency of 1575.42 MHz in the UHF band. The radio signals can pass through clouds, glass, and plastic, but cannot pass through most solid objects, such as buildings or mountains. When passing through liquids, such as seawater, the radio signals are heavily attenuated. Therefore, satellite tags only function when the marine animal is at the ocean surface, making the satellite tags suitable for air-breathing mammals, such as whales and dolphins that surface frequently, but not suitable for whale sharks that remain below the surface for extended periods of time. Even for an air-breathing mammals, the satellite tags only provides information periodically when the animals surface. Consequently, small-scale movements cannot be tracked. Another down side of satellite tags is that they experience high failure rates in the field, including detaching from the whale shark or failing to transfer data when the fish surfaces. Also, retrieving the satellite tag from the whale shark after a study is complete can be difficult, so reusing the costly satellite tag is not always an option.

Each satellite tag 805 contains a GPS receiver that must acquire satellite information very rapidly as the animal momentarily surfaces and must then transmit location information to a remote communication station or store the information in a local memory. This approach requires specially designed components, such as a GPS receiver and communication hardware that are more sophisticated than components found in low-cost, portable GPS receivers commonly used in automobiles. Not surprisingly, satellite tags 805 are expensive and typically cost thousands of dollars each.

A second existing tracking system requires an acoustic tag to provide details about small-scale movements at a resolution of about 100 meters. Like satellite tags, acoustic tags 810 must be attached to the animal, as shown in FIG. 8. Acoustic tags 810 are generally used to monitor marine creatures living or moving in deep water or salt water habitats and can be used to track a wide variety of marine inhabitants, such as salmon, trout, plaice, cod, crabs, sea turtles, and many others. One downside of this system is that it requires a fixed underwater listening station equipped with hydrophones. While this technology is useful for monitoring a whale shark within a limited area, such as near a coral reef, it is not useful for monitoring large-scale movements outside of that area, such as monitoring a migration. Operating and maintaining this type of acoustic tracking system can be tedious. For instance, data must be retrieved from the individual listening stations, which are often located off the coasts of remote destinations that can be difficult to travel to by vehicle. In addition, the listening stations require periodic maintenance that must be conducted underwater by a diver. The costs associated with retrieving the data and maintaining the listening stations can quickly add up.

The method and system described herein for tracking marine animals or objects incorporate the advantages of the preexisting tracking systems in a new way that overcomes at least the various shortcomings described above. The method and system can provide unprecedented insight into the behavior and movement patterns of marine animals, which will improve understanding of these animals and, subsequently, improve conservation efforts.

Radio waves are commonly used when tracking land animals. But salt water presents unique challenges when tracking marine animals. As noted above, radio waves are readily attenuated by seawater, making them a poor choice for sending messages through water. Sound waves, on the other hand, are not impeded by seawater and can actually travel faster in water than in air, allowing for near real-time listening over long distances when using proper equipment. Therefore, acoustic signals provide a useful approach for tracking marine animals in real-time.

An acoustic telemetry system can include an acoustic transmitter for transmitting a sound wave, a hydrophone for listening for the sound wave transmitted by the acoustic transmitter, and a receiver for acquiring an electrical signal from the hydrophone in response to the sound wave. In reef-based telemetry systems, the hydrophone can be configured to listen to the sound waves, and the resulting electrical signal can either be stored in memory or converted into a radio signal for rapid transmission through the air to a receiver located on shore. To overcome the limitations of these fixed position systems, the acoustic telemetry system can be incorporated into a non-fixed, unmanned surface vessel that includes a propulsion system which allows it to follow a marine animal or object of interest across considerable distances.

The unmanned surface vessel for tracking marine animals can be configured to track and follow the movement of an acoustic transmitter attached to a marine animal. Often these acoustic transmitters are simply referred to as "tags." The vessel can automatically track the location of the marine animal beneath the surface of the ocean while remaining on the ocean surface. The vessel can determine the location, speed, and heading of the animal, and from that information, determine how best to follow and track the animal in a way that conserves the vessel's stored energy while also ensuring that the animal's position does not exceed the range of the acoustic tracking system, which could result in losing track of the animal.

Figure 1:
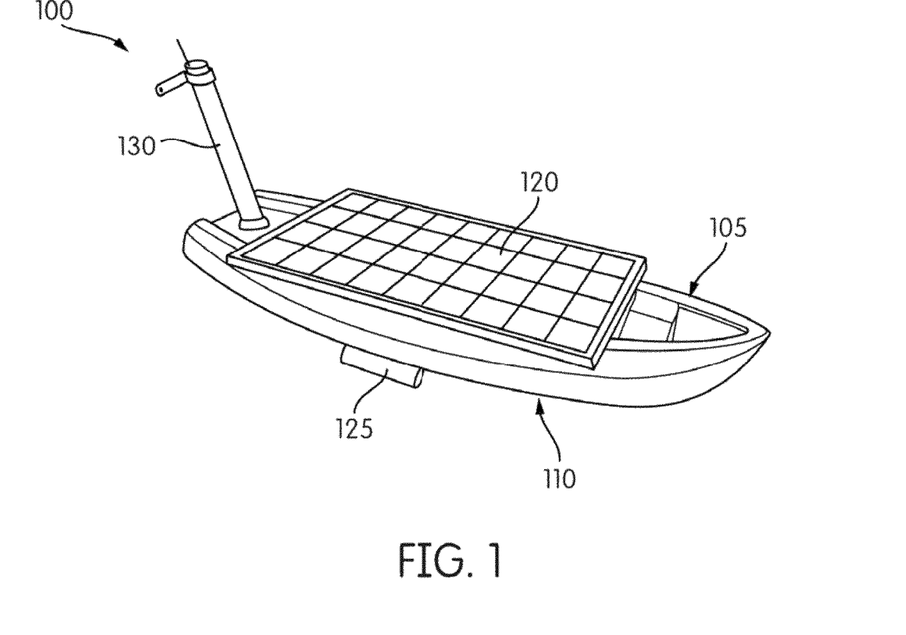
FIG. 1 is a perspective view of an example vessel equipped with a solar panel, thruster mount, and communication mast.
Figure 2:
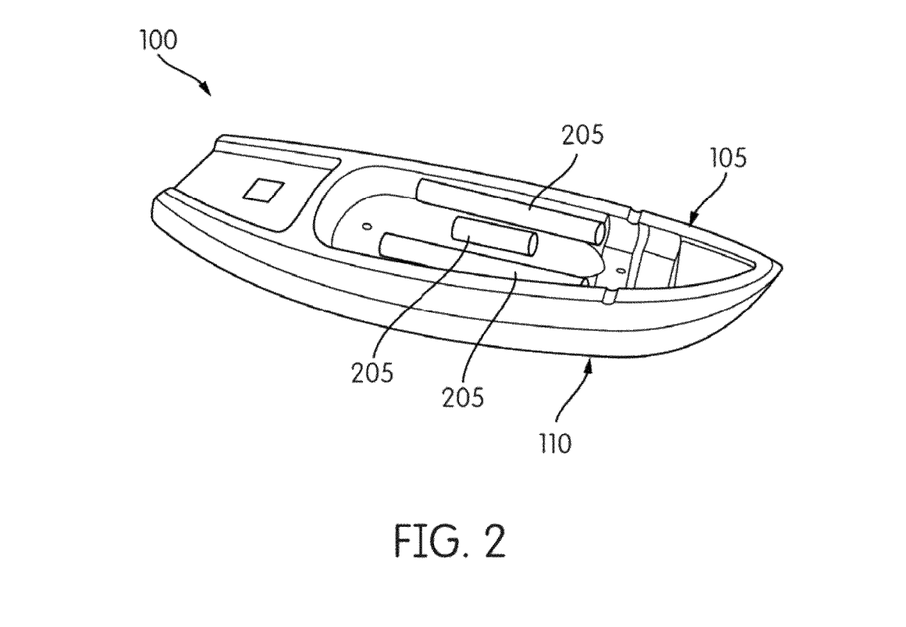
FIG. 2 is a perspective view of the example vessel of FIG. 1 with the solar panel removed to show tubes that house electronics and a rechargeable battery pack.
Figure 3:
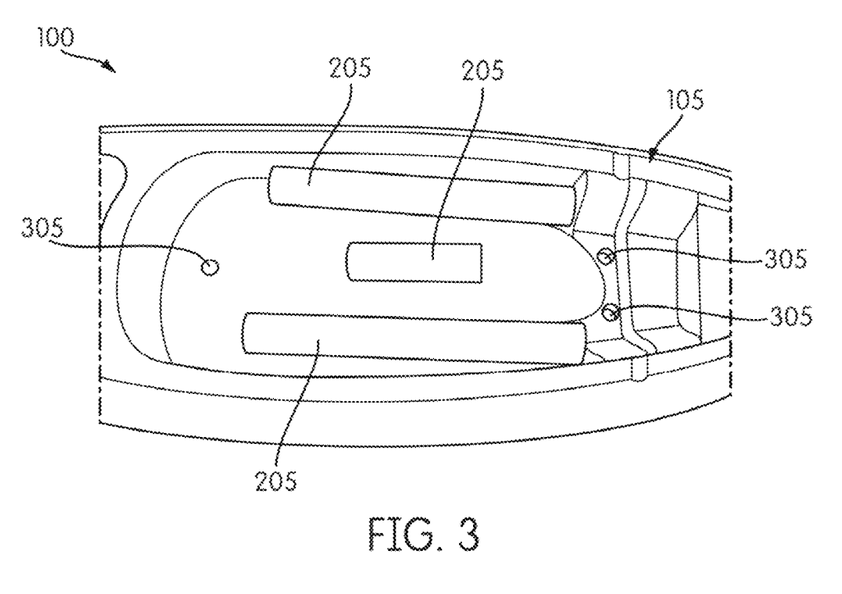
FIG. 3 is a top view of the vessel of FIG. 2 showing drain holes.

As shown in FIG. 1, the vessel 100 can be an autonomous, rugged, and relatively small vessel. The vessel can have a length of less than 10 meters, more preferably less than 5 meters, and even more preferably about 2 meters. With respect to the lengths listed above, the vessel can have a width of less than 5 meters, more preferably less than 2.5 meters, and even more preferably about 1 meter. As shown in FIGS. 2 and 3, the vessel can include one or more watertight compartments 205 for housing the various systems described herein, including electronics and a rechargeable battery pack. In one example, the vessel can be a fully sealed, watertight, self-powered, unmanned vessel that is capable of multi-day missions at sea.

To facilitate draining, the vessel can include one or more drain holes 305 extending from the top surface 105 to the bottom surface of the vessel 110, as shown in FIG. 3. The drain holes 305 allow the vessel to be self-draining and eliminate any need for a bilge pump. The drain holes 305 also provide pathways for wires and facilitate wiring of the various sensors, modules, and systems described herein.

Figure 10:
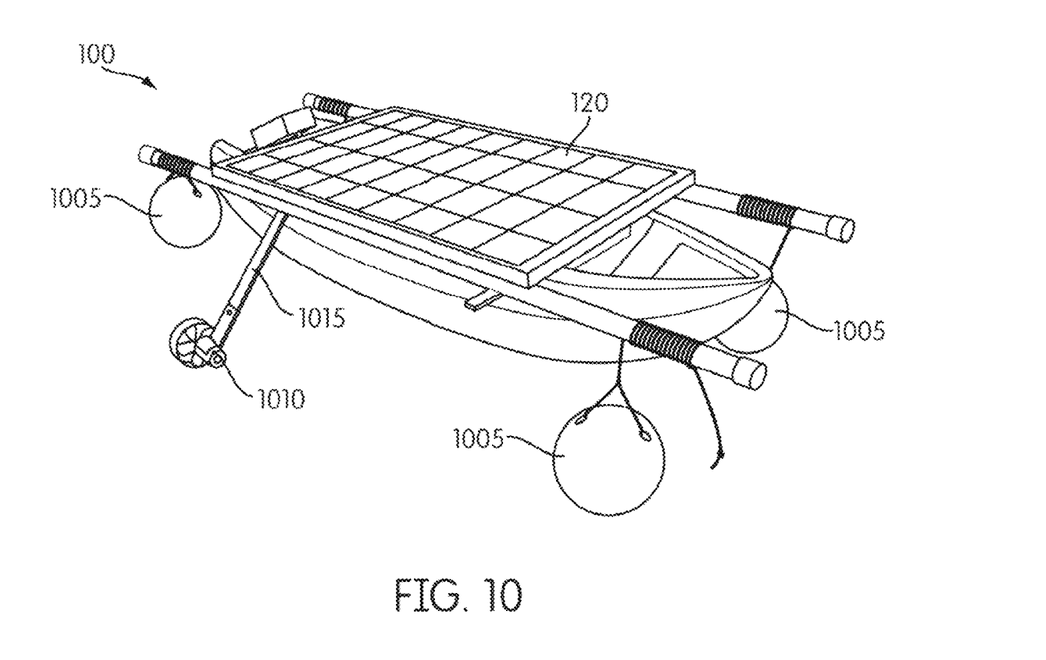
FIG. 10 is a front perspective view of an example vessel.
Figure 11:
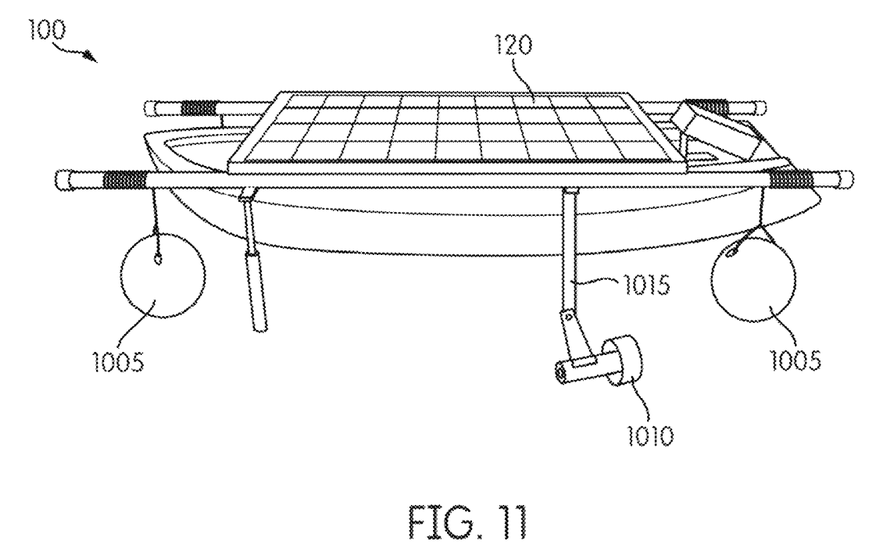
FIG. 11 is a side perspective view of an example vessel.

To allow the vessel to track and follow the animal or object across the open ocean, the vessel can include a propulsion system that contains a power supply. The propulsion system can include a steering system that is separate or integral. For instance, in one integrated configuration, the vessel can include two thrusters attached to the bottom surface of the vessel. The thrusters can be mounted directly to the bottom surface 110 of the vessel or mounted within a thruster housing 125 attached to the bottom surface 110 of the vessel, as shown in FIG. 1. The thrusters can be arranged in parallel and oriented with their discharge openings directed toward the stern of the vessel. The thrusters can be offset from each other by any suitable distance. By controlling the relative discharge from each thruster, the boat can be propelled forward and steered right or left. In an alternate configuration, the vessel can include a single thruster with a rudder positioned proximate the discharge opening. By adjusting the rudder, the direction of the discharge is altered, resulting in a change in the vessel's heading, similar to the operation of a personal watercraft. In another example, as shown in FIGS. 10 and 11, each thruster 1010 can be attached to a mount 1015 extending downward from the vessel. Each thruster 1010 can be mounted outward from the side of the vessel to provide stability and to decrease the turning radius of the vessel. In one example, the thrusters 1010 can be configured to propel the vessel at a speed up to about 4 knots.

To allow the vessel to engage in extended deployments requiring continuous operation, it is desirable to include an energy recovery system aboard the vessel. While this system can take any suitable form, one low cost option is a solar charging system, which can easily be configured to replenish the vessel's stored energy. The solar charging system can include one or more solar panels 120 attached to the top surface 105 of the vessel 100, as shown in FIG. 1, and a charge controller connected between the battery and the solar panel 120. In another example, the solar panels can be mounted below the surface of the water to provide cooling and to prevent the glass surface from fouling. For example, the solar panels can be mounted beneath the vessel at a depth of 0 to 15 centimeters below the water surface. More preferably, the solar panels can be mounted beneath the vessel at a depth of 5 to 10 centimeters below the water surface.

Energy can be stored in any suitable form, such as a battery. In one example, the battery can be a lithium polymer battery. The battery can be subdivided into a plurality of banks to provide flexibility in charging and discharging the battery. For example, smart-charging strategies can be used to improve battery life. Having a plurality of battery banks introduces redundancy into the storage system, so in the event that one battery bank fails, other banks will remain functional.

The vessel can include a system to harness wind energy. For instance, the vessel can include a sail that is deployable and retractable based on wind conditions, such as wind speed and wind direction. For example, if wind speed is suitable, the sail can deploy from a sail mast extending from the vessel or from the top surface of the vessel itself. However, if wind speed becomes unsuitable, the sail can retract to prevent the vessel from capsizing. Alternately, the vessel can include a wind turbine configured to charge the battery. The wind turbine can be attached to the top surface of the vessel and can have fixed or variable pitch blades. The wind turbine can be retractable to prevent damage to the turbine during inclement weather and to prevent the wind turbine from functioning as a sail, which could cause the vessel to capsize amid heavy winds.

Power usage can be carefully controlled to prevent expending all available stored energy. The system can take into account various sources of information when determining how best to follow and track the marine animal or object. If characteristics of the animal's movements are known (e.g. the animal commonly travels a certain distance and then rests), that information can be used to improve the vessel's tracking efficiency. In one example, if the animal is traveling at a certain speed, the vessel can travel at a slower speed to conserve energy with the expectation that the animal will eventually stop to rest, and the vessel will then catch up to the animal. This approach requires that the vessel continuously monitor the location of the animal to ensure that the animal is not approaching the limits of the vessel's sensors, which could result in losing track of the animal.

The vessel can take into account weather when selecting a speed at which to propel the vessel. If several sunny days are forecast, and it is anticipated that ample solar energy will be collected in upcoming days, the vessel can be less concerned with energy conservation and can pursue the animal more aggressively. Also, the vessel can increase the frequency at which it transmits information to the remote communication station. Conversely, if several overcast days are forecast, and it is anticipated that very little solar energy will be collected, the system can be more conservative in its energy usage. Likewise, the frequency of routine functions can be decreased, and the propulsion system can be used only when necessary. Also, certain portions of the vessel, such as sensors and data loggers, can be temporarily deactivated until sufficient energy stores are once again achieved. It is also possible that a backup battery is activated if the primary battery is completely depleted.

Figure 12:
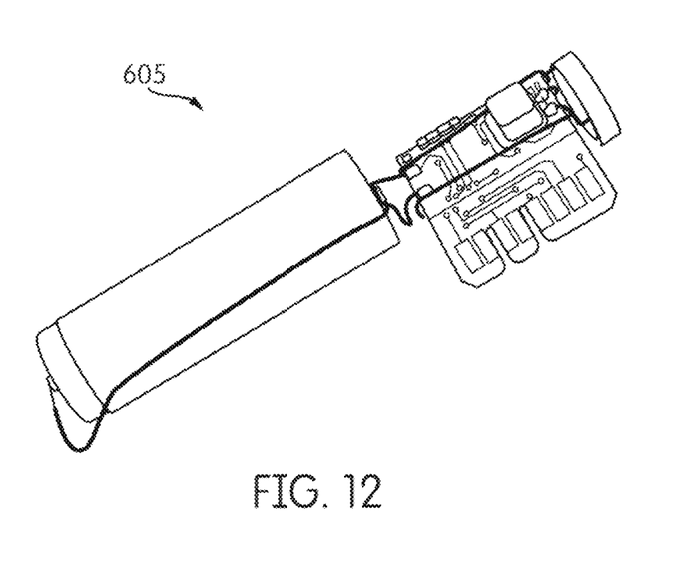
FIG. 12 is an example acoustic transmitter.

The vessel can take oceanographic current information into account when selecting a course to pursue the animal. This can allow the system to reduce power consumption by accounting for the direction and magnitude of ocean currents. For example, the system can determine if an indirect route will be faster and will consume less power than a direct route where the system is forced to work against prevailing currents. To further harness ocean currents, the vessel can include an underwater sail. The underwater sail can be retractable when not needed. The underwater sail, like a rudder, can lend stability to the vessel, and can be deployed during heavy winds to decrease the likelihood of capsizing. To further enhance stability, the vessel can include stabilizers 1005, as shown in FIGS. 11 and 12. In one example, the stabilizers 1005 can be positively buoyant and can be positioned at each corner of the vessel.

Acoustic hydrophones typically include a piezoelectric transducer that generates electricity when subjected to a pressure change. Since sound waves represent a pressure change, the piezoelectric transducer converts the sound waves transmitted by the acoustic transducer into an electrical signal. Through well-known methods, the electrical signals acquired from the various hydrophones can be used to determine the location of the acoustic transducer relative to the hydrophone array. The vessel can then propel itself to reduce the distance between itself and the acoustic transducer.

Figure 4:
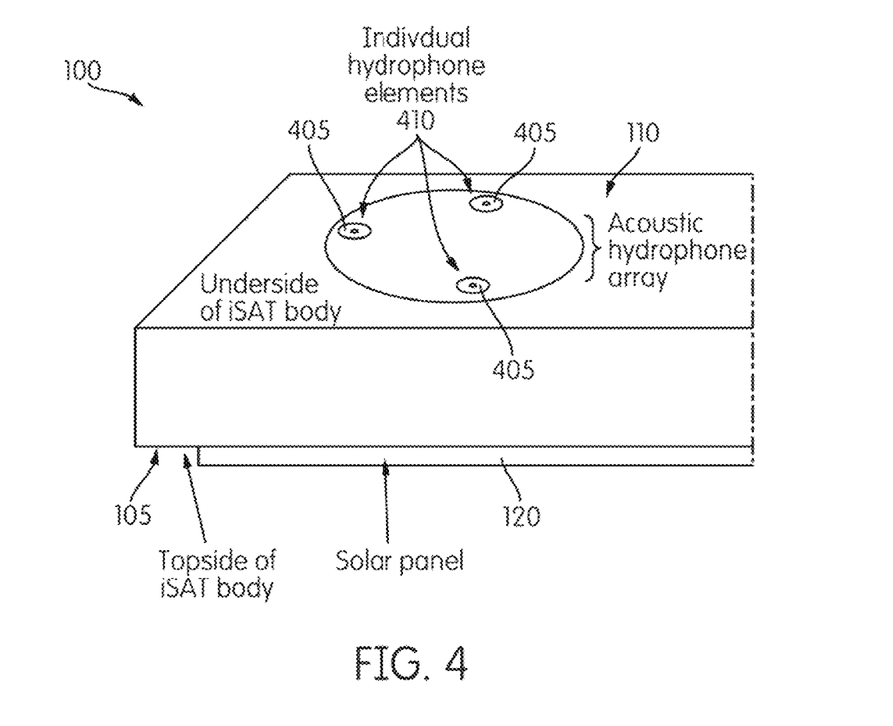
FIG. 4 is a bottom perspective view of a simplified vessel with an acoustic hydrophone array mounted proximate the bottom surface of the vessel.
Figure 5:
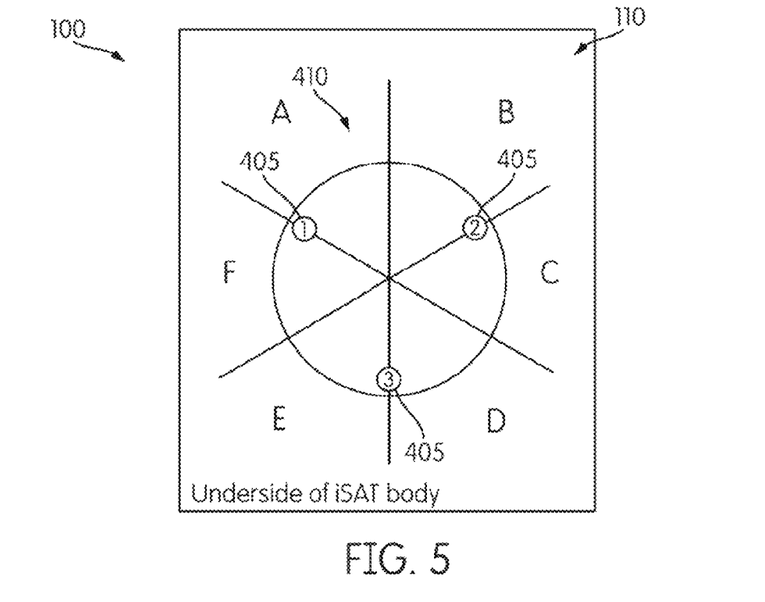
FIG. 5 is a bottom view of a vessel with an acoustic hydrophone array that has three hydrophones and six sextants.
Figure 6:
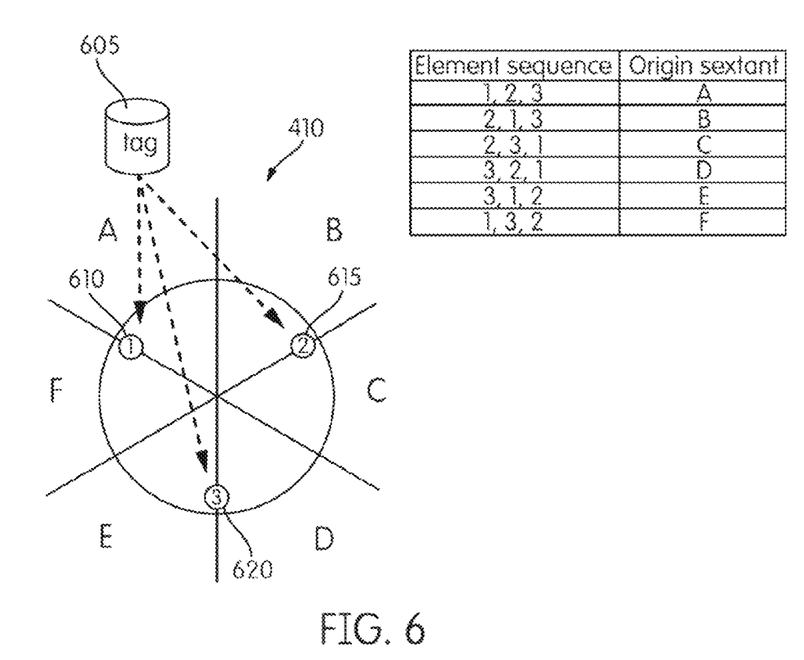
FIG. 6 is a bottom view of vessel with an acoustic hydrophone array showing differing acoustic signal distances from an acoustic transmitter to each hydrophone in an array.
Figure 13:
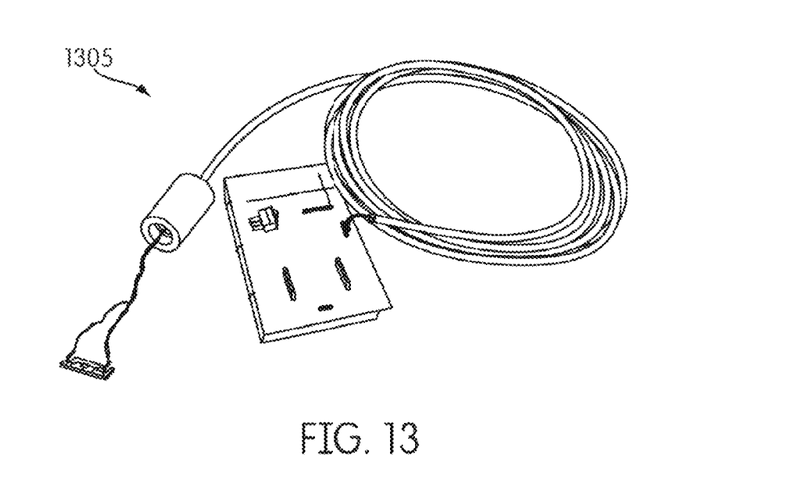
FIG. 13 is an example independent amplifier circuit for a hydrophone.
Figure 14:
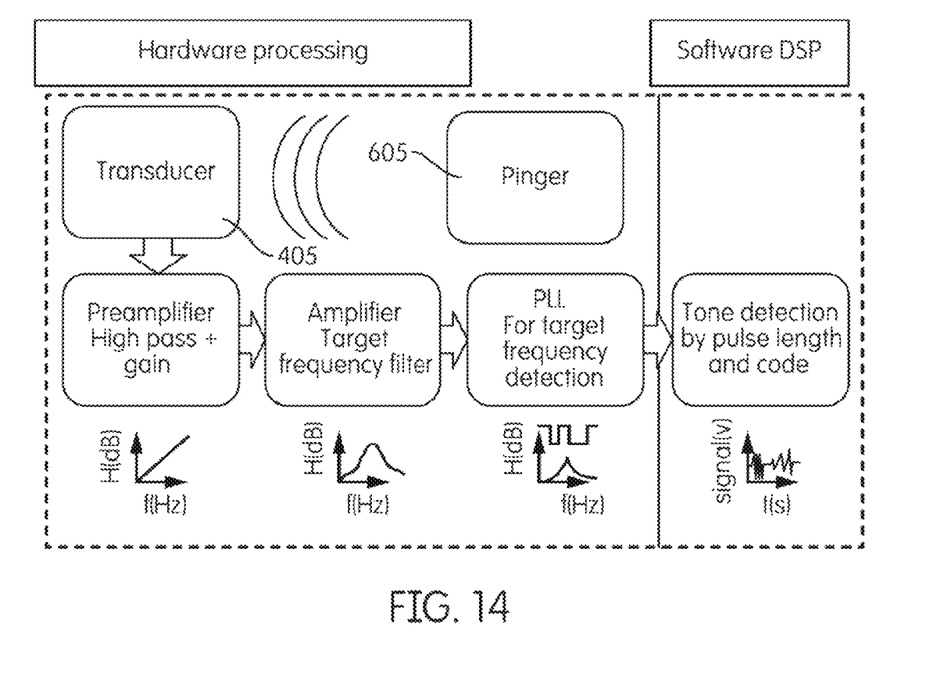
FIG. 14 is an example schematic showing how hardware and software can interface on the vessel.

To determine the location of the animal relative to the position of the vessel, the vessel 100 can include at least one hydrophone attached to the vessel in any suitable way. For instance, the hydrophone can be submerged in the water beneath the vessel or attached to or disposed within the hull of the vessel and exposed to the water. In one example, the hydrophone 405 can be part of a hydrophone array 410, such as three hydrophones positioned in a triangular array on the bottom of the vessel 100, as shown in FIGS. 4-6. Each hydrophone 405 can be connected to an independent amplifier circuit 1305, as shown in FIG. 13, that is configured to process or amplify the signal. When the hydrophones 405 are arranged in a proper hydrophone array 410, the approximate direction of an acoustic transducer 605 relative to the array 410 can be determined by a microprocessor, as shown in FIG. 6.

In one example, the vessel can use a hydrophone array 410 that produces a sextant, as shown in FIGS. 4-6. The acoustic transmitter ("tag") 605 can transmit an acoustic signal ("ping") that can be detected by the individual hydrophones 405 at differing times depending on the location of each hydrophone relative to the location of the acoustic transmitter 605. The hydrophones 405 can be connected to a microprocessor that can resolve the order in which the acoustic signal reaches each hydrophone. Based on this sequential order of receipt, the location of the tag 605 relative to the sextant can be determined. In the example shown in FIG. 6, the acoustic signal would first be heard by a first hydrophone 610, then by a second hydrophone 615, and finally by a third hydrophone 620. As shown in Table 1, this sequence corresponds with sextant A, which indicates that the acoustic signal is originating from a location within sextant A.

TABLE 1

| Element Sequence | Origin Sextant |
| --- | --- |
| 1, 2, 3 | A |
| 2, 1, 3 | B |
| 2, 3, 1 | C |
| 3, 2, 1 | D |
| 3, 1, 2 | E |
| 1, 3, 2 | F |

In this example, the vessel could power the thrusters to align the vessel's heading with the location where the acoustic signal is originating from, and the vessel could continue tracking the target animal or object. This process of heading correction can be continuously or periodically repeated to allow for accurate tracking. The microprocessor can be configured to receive inputs from any of the systems or sensors described herein to further enhance the accuracy of tracking and to do so in an efficient manner.

Once the direction of travel of the animal or object is determined, the vessel can respond accordingly. The vessel can also calculate the distance from the acoustic transducer 605 to the hydrophone array. Knowing this distance allows the vessel to respond in a more sophisticated manner, since over time, the velocity of the animal can be determined from the distance information, which dictates how aggressively the vessel should pursue the animal.

Any suitable type of hydrophone, or an equivalent device, can be used to facilitate tracking. Likewise, if an improvement over existing hydrophones is discovered, that device could also be used with the vessel. In one example, the hydrophone 405 can be a focused transducer with a spherical body around the hydrophone to focus the signals being transmitted from the acoustic transmitter 605 attached to the animal The vessel can include a two-way communication module attached to the vessel 100, and the communication module can be configured to transmit and receive communication signals to and from, respectively, a remote communication station. The communication module can be attached to the vessel 100 or to a mast 130 extending upwardly from the top surface 105 of the vessel to improve the module's ability to reliably transmit and receive information, as shown in FIG. 1. In one example, the mast 130 can extend about 50 centimeters above the vessel. Elevating the communication module above the ocean surface can help overcome signal attenuation caused by swells or wind-generated waves. Although the communication module, as with all other electrical components aboard the vessel, can be contained within one or more watertight cases or compartments, elevating the communication module above the vessel can further protect the module by reducing exposure to the corrosive effects of seawater perpetuated by continuous submersion.

The communication module can incorporate UHF, GSM, and/or satellite communication systems. Each of these systems is well-developed and reliable, and incorporating redundant communication systems can further enhance reliability. Having redundant systems, while not necessary, can provide more options when selecting a suitable channel or frequency on which to transmit and receive signals. Also, depending on the location of the vessel relative to the remote communication station and the amount of stored energy, the vessel can select an appropriate mode of communication to optimize the likelihood of successful communication while also minimizing power consumption. A user at the remote communication station, which can be located on shore, on an ocean-going vessel, or on any type of aircraft, can transmit high-level commands to the communication module, thereby enabling on-the-fly changes to the vessel's mission. Such changes can allow the user to instruct the vessel to avoid certain dangers, such as passing ships or inclement weather. The vessel can also be instructed to return home if a problem is detected that cannot be resolved remotely or if the vessel loses track of the animal or object it is tracking.

In addition to receiving commands and information form the remote communication station, the vessel can also transmit information to the remote communication station. For example, the communication module can transmit real-time updates and status reports based on information acquired from the various sensors, such as water temperature and oceanographic current information, and from various onboard systems, such as the propulsion and energy storage systems. One sample transmission from the vessel to the remote communication station can include information such as battery charge level, vessel speed versus time, animal location versus time, animal speed versus time, animal depth versus time, and GPS coordinates of the vessel versus time.

To improve long-distance communications between the vessel and the remote communication station, a communication relay can be used. The communication relay can be positioned at any point between the vessel and the remote communication station. For instance the communication relay can be onboard an ocean-going vessel or on any type of aircraft, such as a drone or high altitude balloon. The communication relay can increase the effective range of the vessel and decrease power consumption associated with transmitting and receiving signals long distances to the remote communication station. A communication relay can be particularly useful when the vessel is deployed in harsh or distant locations, such as the Arctic Ocean, where remote communication stations cannot easily be established.

The vessel can include various oceanographic sensors. For example, the vessel can include one or more sensors for determining water surface temperature, water salinity, water clarity, oceanographic current information, plankton concentration, water depth, water conductivity, or oxygen concentration. A similar set of remote sensors can be attached to the acoustic transmitter, and remote sensor information can be transmitted to the vessel and received by the hydrophone. The vessel can thereby acquire information about conditions proximate the acoustic transducer, which is attached to the animal and likely well below the ocean surface. This can provide useful information about the animal's behavior and preferences.

Figure 7:
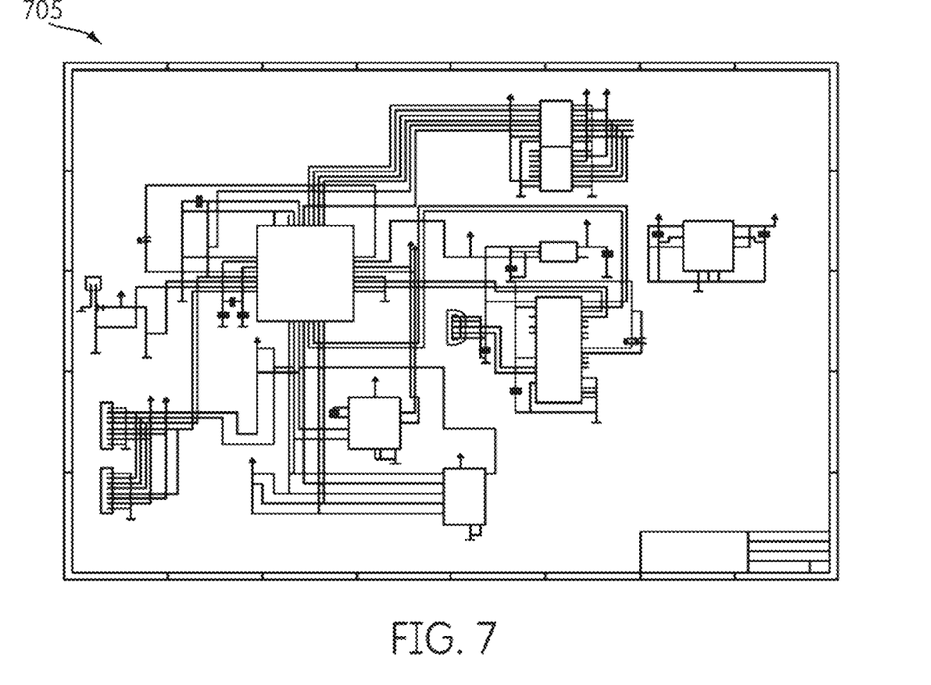
FIG. 7 is an example schematic for a circuit board for the vessel.

The vessel can include one or more circuit boards 705, as shown in FIG. 7. In one example, the circuit board 705 can have a size of less than about 2×2 inches. The circuit board can be housed in a watertight compartment 205, as shown in FIG. 2, and located under the solar panel 120. The circuit board can include various control and processing systems dedicated to the various components of the vessel. In one example, a primary control board can receive and process data from a plurality of other circuit boards on the vessel. More specifically, the primary board can acquire and process sensor information, propulsion system information, and battery charge information, and output real-time data that can be stored in memory or transmitted to the remote communication station. The circuit board can rely on locally stored software. The vessel can also rely on the remote communication station to process data from the vessel and to determine mission commands, and those commands can then be transmitted to the vessel and executed. By outsourcing certain computations to the remote communication station, the vessel can conserve energy.

The vessel 100 can include a navigation module, which can include, for example, a digital compass, a GPS receiver, and/or an accelerometer. The navigation module can include one or more of these navigation components integrated into a circuit board. The navigation module can enable the vessel to determine orientation, rate of movement, and acceleration of the vessel. The navigation module can communicate with the hydrophone array 410 to determine the direction and distance of the acoustic transmitter 605 relative to the hydrophone array.

The vessel can include a central control module that integrates the various components and systems and enables communication between the various components and systems. For instance, the central control module can allow receive information about position, orientation, and velocity from the navigation module, which can allow the propulsion system to be controlled accordingly. Likewise, the central control module can allow the communication module to receive information from the navigation module and the propulsion system, which can then be transmitted to the remote communication station. The user at the remote communication station can then review the information and issue new commands to the vessel as needed. Alternately, calculations can be completed onboard the vessel, and the vessel can autocorrect its mission based on a host of factors and sensor information discussed herein.

The system and method disclosed herein are not limited to tracking whale sharks and can be used to track any type of marine animal, object, underwater vessel, or human. It can also be used for monotonous tasks such as ocean floor mapping or measuring sea temperature and salinity. It can also be used for dangerous activities, such as nocturnal or military operations. The system and method disclosed herein have wide applicability in many markets including, for example, environmental management and conservation programs, eco-tourism, recreation, public and private research, and defense.

The system and method disclosed herein can be used as a safety device for tracking scuba divers beneath the ocean surface. For example, a scuba diver can carry an acoustic transmitter, and the vessel can track the scuba diver's movements making it easier for a dive boat operator to track the location of the diver. To enhance the vessel's visibility, the vessel can include a brightly colored flag or light attached to a mast or its top surface. The communication module on the vessel can be used to relay information between the diver and the dive boat operator.

In another example, the vessel can serve as a research tool for a scuba diver. For instance, the scuba diver can have an underwater research device configured to communicate acoustically with the unmanned surface vessel. The underwater research device can include a tablet computer, or other electronic device, housed in a waterproof case as described in U.S. patent application Ser. No. 13/193,295, filed Jul. 28, 2011, and International Application No. PCT/US2011/046085, filed on Aug. 1, 2011, which is hereby incorporated by reference in its entirety. In one example, the underwater research device can include a communication device that includes an acoustic transmitter and a hydrophone that are compatible with the unmanned surface vessel's acoustic transmitter and hydrophone array.

The underwater research device can include a component, such as an acoustic transmitter, for sending underwater acoustic communications. A message, such as a call, text message, email, data, or file can be encoded by a microprocessor into an acoustic wave that can be transmitted by the underwater research device's acoustic transmitter through the water to the unmanned surface vessel's hydrophone array. In response to receiving the acoustic wave, the hydrophone array on the surface vessel can output an electrical signal that can be decoded by a microprocessor and stored or transmitted to the remote communication station. The underwater research device can include a component, such as a hydrophone, for receiving underwater acoustic communications from the unmanned surface vessel's acoustic transmitter.

The system can be configured to track more than one animal simultaneously, such as several fish within a school of fish, so that if one fish is lost, the system can continue tracking the remaining fish. To accommodate this, the system can employ code division multiple access (CDMA), similar to that found in cell phones, to allow for simultaneous detection of several unique individuals on a single acoustic frequency.

Details of one or more embodiments are set forth in the accompanying drawings and description. Other features, objects, and advantages will be apparent from the description, drawings, and claims. Although a number of embodiments of the invention have been described, it will be understood that various modifications may be made without departing from the spirit and scope of the invention. It should also be understood that the appended drawings are not necessarily to scale, presenting a somewhat simplified representation of various features and basic principles of the invention.

What is claimed is:

1. An unmanned surface vessel for tracking an acoustic transmitter attached to a marine animal or object, comprising:
    a surface vessel, wherein the vessel is configured to track and follow the movement of an acoustic transmitter attached to a marine animal or object;
    a two-way communication module attached to the vessel, wherein the communication module is configured to communicate with a remote communication station;
    a GPS receiver attached to the vessel, wherein the GPS receiver receives location-based information from a global positioning system;
    an acoustic hydrophone attached to a bottom surface of the vessel, wherein the acoustic hydrophone is configured to receive an acoustic signal transmitted from the acoustic transmitter attached to the marine animal or object, and wherein the acoustic hydrophone is part of a three-element hydrophone array;

a microprocessor attached to the three-element hydrophone array; and a propulsion system attached to the bottom surface of the vessel, wherein the propulsion system is configured to enable the vessel to follow the movement of the acoustic transmitter, wherein the three-element hydrophone array produces a sextant, and wherein the microprocessor determines a location of the acoustic transmitter by determining a sequential order of the acoustic signal received by each hydrophone element and associating the sequential order to a portion of the sextant.

2. The unmanned surface vessel of claim 1, wherein each hydrophone element is coupled to an independent amplifier circuit.

3. The unmanned surface vessel of claim 1, further comprising one or more sensors for determining water temperature, water salinity, water clarity, oceanographic current information, plankton concentration, water depth, water conductivity, or oxygen concentration.

4. The unmanned surface vessel of claim 1, wherein the propulsion system comprises at least one thruster attached to the bottom surface of the vessel.

5. The unmanned surface vessel of claim 1, further comprising a solar charging system comprising a battery, a solar panel attached to a top surface of the vessel, and a charge controller electrically connected between the battery and the solar panel.

6. The unmanned surface vessel of claim 5, wherein the battery comprises a plurality of battery banks each connected to the charge controller.

7. The unmanned surface vessel of claim 6, wherein the battery is a lithium polymer battery.

8. The unmanned surface vessel of claim 1, wherein the communication module is configured to receive commands from the remote communication station.

9. The unmanned surface vessel of claim 1, wherein the communication module is configured to transmit information to the remote communication station.

10. The unmanned surface vessel of claim 1, further comprising a digital compass.

11. The unmanned surface vessel of claim 1, further comprising an accelerometer.

12. The unmanned surface vessel of claim 1, wherein the surface vessel has a length of about 2 meters and a width of about 1 meter.

13. A method for tracking an acoustic transmitter attached to a marine animal or object, the method comprising:

receiving an acoustic signal transmitted from an acoustic transmitter with a hydrophone array attached to an unmanned surface vessel, wherein the acoustic hydrophone is part of a three-element hydrophone array that produces a sextant;

determining a distance, speed, and direction of travel of the acoustic transmitter relative to the vessel based on the sequential order of the received acoustic signal at each hydrophone element and associating the sequential order of the received acoustic signal with a portion of the sextant;

receiving a GPS signal from a global positioning system with a GPS receiver attached to the vessel;

determining the location of the vessel based on the received GPS signal;

propelling the vessel toward the acoustic transmitter based on the distance, speed, and direction of travel of the acoustic transmitter.

14. The method of claim 13, further comprising taking into account a battery charge level when selecting a speed or direction at which to propel the vessel.

15. The method of claim 13, further comprising taking into account an oceanographic current or a wind condition when selecting a speed or direction at which to propel the vessel.

16. The method of claim 13, further comprising taking into account characteristics of the animal's movement when selecting a speed or direction at which to propel the vessel.

17. The method of claim 13, further comprising transmitting information from a communication module attached to the vessel to a remote communication station.

18. The method of claim 17, wherein information transmitted from the communication module to the remote communication station comprises battery charge level, vessel speed versus time, animal location versus time, animal speed versus time, animal depth versus time, or GPS coordinates of the vessel versus time.

19. The method of claim 13, further comprising transmitting information from a remote communication station to a communication module attached to the vessel.

20. The method of claim 19, wherein information transmitted from the remote communication station to the communication module comprise a high-level command.

21. The method of claim 19, wherein the remote communication station is located on shore, on the ocean surface, or in the air.

22. The method of claim 13, further comprising receiving sensor information at the vessel from one or more sensors proximate the vessel.

23. The method of claim 22, further comprising determining water temperature, water salinity, water clarity, oceanographic current information, plankton concentration, water depth, water conductivity, or oxygen concentration based on the sensor information received from the sensor information received from the sensors proximate the vessel.

24. The method of claim 13, further comprising receiving remote sensor information at the vessel from one or more remote sensors proximate the acoustic transmitter.

25. The method of claim 24, further comprising determining water temperature, water salinity, water clarity, oceanographic current information, plankton concentration, water depth, water conductivity, or oxygen concentration based on the remote sensor information received from the remote sensors proximate the acoustic transmitter.

* * * * *